United States Patent
Kou et al.

(10) Patent No.: US 12,198,836 B2
(45) Date of Patent: Jan. 14, 2025

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Kyousyou Kou, Mie (JP); Housei Mizuno, Mie (JP); Miyu Aramaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 198 days.

(21) Appl. No.: 17/917,740

(22) PCT Filed: Mar. 16, 2021

(86) PCT No.: PCT/JP2021/010599
§ 371 (c)(1),
(2) Date: Oct. 7, 2022

(87) PCT Pub. No.: WO2021/210325
PCT Pub. Date: Oct. 21, 2021

(65) Prior Publication Data
US 2023/0162885 A1 May 25, 2023

(30) Foreign Application Priority Data

Apr. 16, 2020 (JP) .................................. 2020-073371

(51) Int. Cl.
*H01B 7/08* (2006.01)
*B60R 16/02* (2006.01)
(Continued)

(52) U.S. Cl.
CPC ....... *H01B 7/0846* (2013.01); *B60R 16/0215* (2013.01); *H01B 7/40* (2013.01); *H02G 3/04* (2013.01)

(58) Field of Classification Search
CPC ... B60R 16/0207; B60R 16/0215; H01B 7/08; H01B 7/0847; H01B 7/0045; H02G 3/0437; H02G 3/30; H02G 3/32
See application file for complete search history.

(56) References Cited

U.S. PATENT DOCUMENTS

| 2,397,291 | A | * | 3/1946 | Robertson | ............... | F16L 3/223 |
| | | | | | | D8/356 |
| 5,276,759 | A | * | 1/1994 | Nguyen | ............... | G02B 6/4403 |
| | | | | | | 174/121 R |

(Continued)

FOREIGN PATENT DOCUMENTS

| JP | 63-025130 | 2/1988 |
| JP | 05-046608 | 6/1993 |

(Continued)

OTHER PUBLICATIONS

Japan Office Action issued in Japan Patent Application No. 2020-73371, dated Aug. 8, 2023, together with English translation thereof.

(Continued)

*Primary Examiner* — Paresh Paghadal
(74) *Attorney, Agent, or Firm* — Greenblum & Bernstein, P.L.C.

(57) ABSTRACT

A wiring member includes a sheet, a holding member fixed to the sheet, and a first wire-like transmission member held by the holding member. The holding member includes a holding part in which a groove and a protrusion narrowing a width dimension of an opening part of the groove are formed. The first wire-like transmission member is housed in the groove.

10 Claims, 3 Drawing Sheets

(51) Int. Cl.
  *H01B 7/40* (2006.01)
  *H02G 3/04* (2006.01)

(56) References Cited

U.S. PATENT DOCUMENTS

| | | | | |
|---|---|---|---|---|
| 5,502,287 | A * | 3/1996 | Nguyen | H01B 7/0846 174/117 A |
| 5,682,141 | A * | 10/1997 | Morimoto | G01V 15/00 324/326 |
| 5,952,616 | A * | 9/1999 | Morrow | H05K 5/0247 174/72 A |
| 6,225,561 | B1 * | 5/2001 | Mori | B60R 16/0207 174/154 |
| 6,360,051 | B1 * | 3/2002 | Daoud | G02B 6/4471 385/136 |
| D468,996 | S * | 1/2003 | Sarkinen | D8/356 |
| 6,551,129 | B2 * | 4/2003 | Kato | H01R 4/66 439/497 |
| D488,054 | S * | 4/2004 | Myers | D8/356 |
| D644,501 | S * | 9/2011 | Chen | D8/356 |
| 2007/0235597 | A1 * | 10/2007 | Winchester | F16L 3/223 248/68.1 |
| 2009/0065249 | A1 * | 3/2009 | Silvers | H02G 3/305 174/72 A |
| 2010/0233917 | A1 * | 9/2010 | Sorensen | H02G 3/30 264/272.11 |
| 2011/0147542 | A1 * | 6/2011 | Hoek | H02G 3/32 248/68.1 |
| 2013/0298357 | A1 * | 11/2013 | Goehlich | F16B 11/006 24/304 |
| 2015/0211659 | A1 * | 7/2015 | Even | F03D 80/80 248/69 |
| 2017/0145189 | A1 * | 5/2017 | Kang | C08K 7/00 |
| 2019/0287700 | A1 * | 9/2019 | Hamada | H01B 7/0045 |
| 2019/0392963 | A1 | 12/2019 | Ishida et al. | |
| 2020/0080664 | A1 * | 3/2020 | Perry | F16L 3/18 |
| 2021/0184325 | A1 * | 6/2021 | Wu | H01Q 1/12 |

FOREIGN PATENT DOCUMENTS

| | | |
|---|---|---|
| JP | 08-002348 | 1/1996 |
| JP | 08-507641 | 8/1996 |
| JP | 09-199269 | 7/1997 |
| JP | 11-308740 | 11/1999 |
| JP | 2018-137208 | 8/2018 |
| JP | 6579227 | 9/2019 |

OTHER PUBLICATIONS

International Search Report issued in International Patent Application No. PCT/JP2021/010599, dated May 25, 2021, along with an English translation thereof.

International Preliminary Report on Patentability issued in International Patent Application No. PCT/JP2021/010599, dated Oct. 20, 2022, along with an English translation thereof.

* cited by examiner

WIRING MEMBER

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Document(s)

Patent Document 1: Japanese Patent Application Laid-Open No. 2013-137208

SUMMARY

Problem to be Solved by the Invention

It is desired that plural types of electrical wire are simply fixed to a sheet-like functional exterior member.

Accordingly, an object is to provide a technique capable of simply fixing a wire-like transmission member to a sheet regardless of a type of the wire-like transmission member.

Means to Solve the Problem

A wiring member according to the present disclosure includes: a sheet; at least one holding member fixed to the sheet; and a first wire-like transmission member held by the holding member, wherein the holding member includes a holding part in which a groove and a protrusion narrowing a width dimension of an opening part of the groove are termed, and the first wire-like transmission member is housed in the groove.

Effects of the Invention

According to the present disclosure, a wire-like transmission member can be simply fixed to a sheet regardless of a type of the wire-like transmission member.

DESCRIPTION OF EMBODIMENT(S)

Description of Embodiment of Present Disclosure

Embodiments of the present disclosure are listed and described firstly.

A wiring member according to the present disclosure is as follows.

(1) A wiring member includes: a sheet; at least one holding member fixed to the sheet; and a first wire-like transmission member held by the holding member, wherein the holding member includes a bolding part in which a groove and a protrusion narrowing a width dimension of an opening part of the groove are formed, and the first wire-like transmission member is housed in the groove. The first wire-like transmission member is held by the holding member fixed to the sheet. The protrusion is formed in the holding part, thus the first wire-like transmission member hardly comes out of the groove. Accordingly, the wire-like transmission member can be simply fixed to the sheet regardless of a type of the wire-like transmission member.

(2) The wiring member according to (1) may further include a second wire-like transmission member fused to the sheet. Accordingly, the second wire-like transmission member is directly held by the sheet in the wiring member.

(3) In the wiring member according to (1) or (2), the holding member may be fused to the sheet. Accordingly, a member for fixing the sheet and the holding member can be omitted in the wiring member.

(4) In the wiring member according to any one of (1) to (3), it is also applicable that the first wire-like transmission member includes a wire-like transmission member in which a covering layer is made of a first resin material, and a surface of the sheet on which the first wire-like transmission member is disposed is made of a second resin material different from the first resin material. Accordingly, the first wire-like transmission member hardly fused to the sheet is fixed to the sheet via the holding member.

(5) In the wiring member according to any one of (1) to (4), the plurality of holding members may be provided in a width direction of the sheet. Accordingly, when the wiring member is bended around an axis along a longitudinal direction, the sheet, is easily bended between the holding members, and bending of the holding member is suppressed. Accordingly, when the wiring member is bended around the axis along the longitudinal direction, the wire-like transmission member hardly comes out of the holding member.

(6) In the wiring member according to any one of (1) to (5), a tip end portion of a sidewall part of the groove may be thermally deformed to form the protrusion. Accordingly, a shape of the holding member before the formation of the protrusion can be simplified.

(7) In the wiring member according to any one of (1) to (6), it is also applicable that the holding members are provided in a plurality of positions at intervals along a longitudinal direction of the first wire-like transmission member, and the holding members in the plurality of positions are fixed to one piece of the sheet. Accordingly, the plurality of holding members are positioned by the sheet. A region in which the holding member is provided can be reduced compared with a case where the holding member is provided over the whole first wire-like transmission member.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 1:
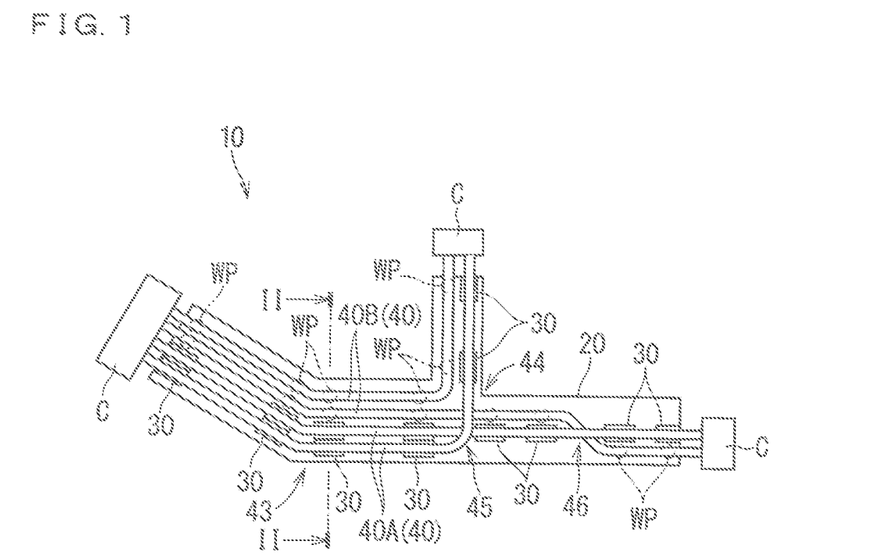
FIG. 1 is a schematic plan view illustrating a wiring member according to an embodiment 1.
Figure 2:
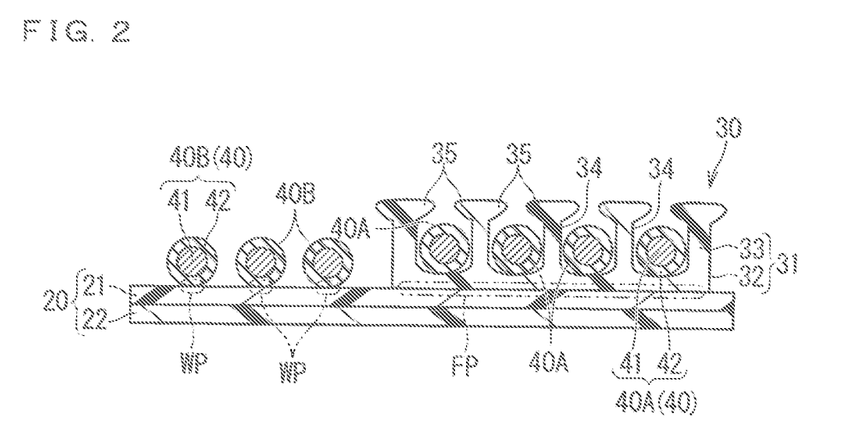
FIG. 2 is a cross-sectional view of the wiring member cut along a II-II line in FIG. 1.
Figure 3:
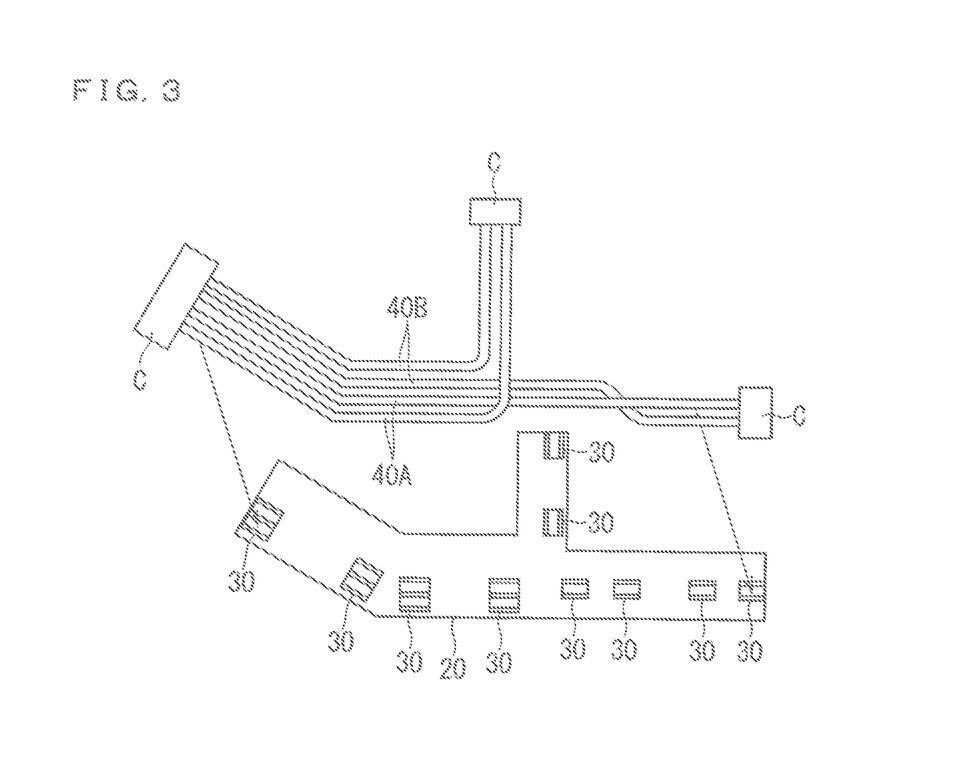
FIG. 3 is an exploded plan view illustrating the wiring member according to the embodiment 1.

A wiring member 10 according to an embodiment 1 is described hereinafter. FIG. 1 is a schematic plan view illustrating the wiring member 10 according to the embodiment 1. FIG. 2 is a cross-sectional view of the wiring member 10 cut along a II-II line in FIG. 1. FIG. 3 is an exploded plan view illustrating the wiring member 10 according to the embodiment 1.

The wiring member 10 includes a sheet 20, a holding member 30, and a plurality of wire-like transmission members 40.

The sheet 20 includes a fusion layer 21. Herein, the sheet 20 has a double layer structure of the fusion layer 21 and an additional layer 22. The sheet 20 may have a single layer structure, or may also have a three or more layer structure.

The fusion layer 21 includes a resin material, or preferably includes a thermoplastic resin material. The resin material of the fusion layer 21 is softened and fused to a fusion target. A type of the resin material is mu particularly limited, but polyvinyl chloride (PVC), polyethylene (PE), polypropylene (PP), or polyethylene terephthalate (PET) can be adopted, for example. One surface of the fusion layer 21 is a surface of the sheet 20 having contact with the holding member 30 and some wire-like transmission member 40.

A structure of the fusion layer 21 is not particularly limited. For example, the fusion layer 21 may be a sheet having an evenly filled cross-sectional surface (also referred to as a non-foam sheet or a solid sheet, for example). The fusion layer 21 is also considered a foam sheet, for example. The fusion layer 21 is also considered a fibrous material sheet such as a braided cloth, a woven cloth, or a non-woven cloth, for example.

The additional layer 22 is formed of a material different from that of the fusion layer 21, or has a different structure. The additional layer 22 increases a function of the fusion layer 21, or adds a function which the fusion layer 21 does not have to the sheet 20. A material constituting the additional layer 22 is a material described for the fusion layer 21 described above or metal, for example. A structure of the additional layer 22 may be any of the structure described for the fusion layer 21 described above. One surface of the additional layer 22 is a surface of the sheet 20 directed to a side opposite to the wire-like transmission member 40.

The fusion layer 21 and the additional layer 22 are fixed to each other while the other surface of the fusion layer 21 and the other surface of the additional layer 22 have contact with each other. A fixing state of the fusion layer 21 and the additional layer 22 is not particularly limited, however, fixing by fusion or adhesion is preferable. For example, when at least one of the fusion layer 21 and/or the additional layer 22 is a sheet having voids in a surface such as a fibrous material sheet or a foam sheet, a resin material or an adhesive agent enters the voids and the layers can be fixed to each other. Such a configuration causes so-called anchor effect, thus the fusion layer 21 and the additional layer 22 are rigidly fixed.

In the description herein, the fusion layer 21 is a solid sheet formed of resin and the additional layer 22 is a fibrous material sheet. In the description herein, the fusion layer 21 and the additional layer 22 are fused to each other. That is to say, the resin of the fusion layer 21 enters between the fibers of the additional layer 22 while having flowability, and is then hardened. Accordingly, a state where the resin of the fusion layer 21 enters between the fibers of the additional layer 22 is maintained, and the fusion layer 21 and the additional layer 22 are rigidly fixed.

The fusion layer 21 and the additional layer 22 are formed to have the same size (the same planar shape). One of the fusion layer 21 and the additional layer 22 may also be formed to be larger than the other one thereof, the fusion layer 21 and the additional layer 22 are wholly fixed at a region where they have contact with each other. The fusion layer 21 and the additional layer 22 may also be fixed only at a part of a region where they have contact with each other.

The sheet 20 may be a flexible member. For example, the fusion layer 21 is a resin layer having an evenly filled cross-sectional surface made up of flexible resin such as flexible PVC as a material, the additional layer 22 is a non-woven cloth made up of PET as a material, and the sheet 20 is a flexible member. For example, the sheet 20 may have a plastic property so as to be able to follow bending of the wire-like transmission member 40. It is also applicable that the wiring member 10 can be bended in a thickness direction (bending so that a told line follows a main surface of the sheet 20) in a portion where the sheet 20 is provided. The sheet 20 may be a member which cannot be curved in the thickness direction. The sheet 20 may be a member which is not broken but can be bended at a time of being bended in the thickness direction. The sheet 20 may be a member which is not broken but can be bended at a time of being bended in the thickness direction.

The holding member 30 includes a holding part 31. A groove 34 and a protrusion 35 are formed in the holding part 31. The holding part 31 includes a bottom part 32 and a plurality of sidewall parts 33. The bottom part 32 and the plurality of sidewall parts 33 are formed into a plate-like shape. The plurality of sidewall parts 33 are formed to protrude on one surface of the bottom part 32. The plurality of side wall parts 33 extend in parallel to each other. A portion surrounded by the bottom part 32 and the two sidewall pans 33 constitutes the groove 34. The protrusion 35 is formed on a tip end portion of the sidewall part 33. The protrusion 35 narrows a width dimension of an opening part of the groove 34.

The holding member 30 is fixed to the sheet 20. The holding member 30 is fused to the sheet 20. Herein, the other surface of the bottom part 32 has contact with the fusion layer 21. The other surface of the bottom part 32 and the fusion layer 21 are fused to each other. Tire other surface of the bottom part 32 may be wholly fused to the fusion layer 21. A part of the other surface of the bottom part 32 may be wholly fused to the fusion layer 21.

At least one holding member 30 is provided. Herein, the plurality of holding members 30 are provided on one sheet 20. One holding member 30 is formed to be smaller than the sheet 20. A width dimension of the holding member 30 is smaller than that of the sheet 20. A length dimension of the holding member 30 is smaller than that of the sheet 20.

All of the plurality of holding members 30 may be formed to have the same shape. Some of the plurality of holding members 30 may be formed to have a shape different from the other some thereof. For example, the number of the grooves 34 in some of the plurality of bolding members 30 may be different from that in the other some of the plurality of holding members 30.

In the example illustrated in FIG. 2, four grooves 34 are provided in one holding member 30. Any number is applicable as the number of the grooves 34 provided in one holding member 30, thus one to three grooves 34 or five or more grooves 34 are also applicable.

The plurality of wire-like transmission members 40 are wire-like members transmitting electrical power or light, for example. For example, the wire-like transmission member 40 may be a general wire having a core wire and a covering around the core wire, or may also be a shielded wire, an electrical cable, an enamel wire, a nichrome wire, or an optical fiber cable. The wire-like transmission member 40 includes a transmission wire body 41 and a covering layer 42.

The transmission wire body 41 is a portion transmitting electrical power or light. The transmission wire body 41 corresponds to a conductor core wire in the electrical wire, and corresponds to a core and a clad in an optical fiber cable. The covering layer 42 covers the transmission wire body 41. The covering layer 42 is formed of a resin material extruded around the transmission wire body 41 to cover it, for example. A type of the resin material is not particularly limited, however, PVC, PE, PP, and PET, for example, can be adopted.

The wire-like transmission member 40 transmitting the electrical power may be various kinds of signal lines or various kinds of power lines. Some of the wire-like transmission members 40 transmitting the electrical power may be used as an antenna or coil, for example, transmitting or receiving a signal or electrical power to or from a space. The wire-like transmission member 40 may be a single wire-like object or a composite object of a plurality of wire-like objects (a twisted wire and a cable made up of a plurality of wire-like objects covered by a sheath). When the wire-like transmission member 40 is a cable, a sheath is also included in the covering layer 42.

The plurality of wire-like transmission members 40 are assumed to be members connecting components in a vehicle. An end portion of the wire-like transmission member 40 extends from the sheet 20 to be located on an outer side of the sheet 20. An intermediate portion of the wire-like transmission member 40 except for the end portion is disposed on the sheet 20. A connector C, for example, is provided on an end portion of the wire-like transmission member 40. This connector C is connected to a connector provided in the other side component, thus the wire-like transmission member 40 is connected to the other side component. That is to say, the present wiring member 10 is used as the wiring member 10 electrically connecting various types of component in a vehicle, for example (or connecting them so that they can perform optical communication). The end portion of the wire-like transmission member 40 may also be located on the sheet 20. A connector housing of the connector C may be fixed to the sheet 20.

The plurality of wire-like transmission members 40 include a first wire-like transmission member 40A and a second wire-like transmission member 40B. A fixing state of being fixed to the sheet 20 is different between the first wire-like transmission member 40A and the second wire-like transmission member 40B. Specifically, the first wire-like transmission member 40A is held by the holding member 30. The first wire-like transmission member 40A is housed in the groove 34. The first wire-like transmission member 40A is housed in the groove 34 to be closer to the bottom part 32 in relation to the protrusion 35. Accordingly, the protrusion 35 prevents the first wire-like transmission member 40A from coming out of the groove 34. The second wire-like transmission member 40B is fused to the sheet 20. The fusion layer 21 has contact with the second wire-like transmission member 40B. The fusion layer 21 is fused to the covering layer 42 on an outermost side of the second wire-like transmission member 40B.

The covering layer 42 of the first wire-like transmission member 40A is made of a first resin material. The fusion layer 21 of the sheet 20 is made of a second resin material different from the first resin material. Herein, the covering layer 42 of the second wire-like transmission member 40B is also made of the same second resin material as the fusion layer 21. Herein, the holding member 30 is also made of the same second resin material as the fusion layer 21. Any combination is applicable as a combination of the first resin material and the second resin material as long as different types of resin material are used as the combination. For example, it is also applicable that the first resin material is PVC and the second resin material is PE. For example, it is also applicable that the first resin material is PE and the second resin material is PVC.

The holding member 30 may be a member which does not have a plastic property. The holding member 30 may have rigidity so that it cannot be elastically deformed to curve the bottom part 32. For example, it is also applicable that the sheet 20 and the covering layer 42 are flexible members having a plastic property, and the holding member 30 is a member harder than the sheet 20 and the covering layer 42. When the fusion layer 21 and the covering layer 42 having hardness different from the holding member 30 and the holding member 30 are formed of the same type of resin material, they are formed as follows, for example. That is to say, a method including a known method can be adopted in accordance with a type of the resin material as a method of changing the hardness of the resin material. Specifically, in a case of PVC, for example, flexible PVC and hard PVC are obtained by changing an amount of a plasticizing agent to be added, for example. The hard PVC is harder than the flexible PVC. The flexible PVC is used for the fusion layer 21 and the covering layer 42, and the hard PVC is formed for the holding member 30, thus the holding member 30 is harder than the sheet 20 and the covering layer 42. For example, when the resin material is PE, it is known that low density PE is softer than high density PE. The low density PE is used for the fusion layer 21 and the covering layer 42, and the high density PE is formed for the holding member 30, thus the holding member 30 is harder than the sheet 20 and the covering layer 42.

In each drawing, a portion where the sheet 20 and the second wire-like transmission member 40B are fused to each other is indicated as a fusion part WP. In the similar manner, a portion where the sheet 20 and the holding member 30 are fixed to each other is indicated as a fixing part FP. Herein, the sheet 20 and the holding member 30 are fused to each other. Accordingly, the fixing part FP is also the fusion part.

A means of forming such a fusion state is not particularly limited, however, adoptable are various types of fusion means such as ultrasonic fusion, heating pressurizing fusion, hot air fusion, and high-frequency fusion. When the fusion state is formed by these means, the fusion part WP is in a state of fusion fixation by those means. Specifically, when the fusion part WP is formed by ultrasonic fusion, the fusion part WP is an ultrasonic fusion part, for example.

The plurality of fusion parts WP are provided at intervals along an extension direction of the wire-like transmission member 40. The fusion part WP may be sequentially provided along the extension direction of the wire-like transmission member 40. The fixing part FP is provided over the whole holding member 30 in a width direction thereof. The plurality of fixing parts FP may be provided at intervals along the width direction of the holding member 30.

The holding member 30 is provided in a plurality of positions at intervals along the longitudinal direction of the first wire-like transmission member 40A. The holding member 30 in the plurality of positions is fixed to one sheet 20. The holding member 30 is provided in a position in the second wire-like transmission member 40B on a lateral side of the fusion part WP The holding member 30 may also be provided in a portion of the second wire-like transmission member 40B where the fusion part WP is not provided.

One or the plurality of first wire-like transmission members 40A and second wire-like transmission members 40B are provided. Any number is applicable as the number of the first wire-like transmission members 40A and the second wire-like transmission members 40B, thus both the plurality of first wire-like transmission members 40A and second wire-like transmission members 40B are provided herein. FIG. 1 and FIG. 3 illustrate four wire-like transmission members 40 as a representative of the plurality of wire-like transmission members 40.

The sheet 20 and the holding member 30 keep the plurality of wire-like transmission members 40 in a state of being arranged side by side. The wiring member 10 is thereby flatly formed. The sheet 20 and the holding member 30 keep the wire-like transmission member 40 in a state of extending along a predetermined route. A route of the wire-like transmission member 40 is a route along which the wire-like transmission member 40 extends on an assembly target (for example, a vehicle) when the wiring member 10 is assembled to the assembly target. Accordingly, when the wiring member 10 is assembled to a vehicle, for example, the wire-like transmission member 40 is easily kept in a state of following a predetermined route in the vehicle.

As illustrated in FIG. 1, the route of the wire-like transmission member 40 includes a bending part 43 and a branch part 44 herein. The bending part 43 is a portion where the plurality of wire-like transmission members 40 are bended while being in parallel to each other. The branch part 44 is a portion where some wire-like transmission member 40 is branched to extend in a direction different from the oilier some wire-like transmission member 40. Herein, some first wire-like transmission member 40A and second wire-like transmission member 40B are branched from the other some first wire-like transmission member 40A and second wire-like transmission member 40B. It is also applicable that one of the first wire-like transmission member 40A and the second wire-like transmission member 408 are not branched but collectively extend in the branch part 44. The first wire-like transmission member 40A and the second wire-like transmission member 40B may be branched from each other. It is sufficient that at least one of the first wire-like transmission member 40A and/or the second wire-like transmission member 40B is branched.

Herein, the sheet 20 is formed into a shape along a route of the wire-like transmission member 40. The sheet 20 includes a portion bended in accordance with a bended route of the wire-like transmission member 40. That is to say, the sheet 20 is also bended in the bending part 43. The sheet 20 includes a portion branched in accordance with a branched route of the wire-like transmission member 40. That is to say, the sheet 20 is also branched in the branch part 44. The sheet 20 may be formed into one large rectangular shape, for example.

Intersection parts 45 and 46 where the plurality of wire-like transmission members 40 intersect with each other are provided. Herein, the intersection pans 45 and 46 include a branch intersection part 45 and a displacement intersection part 46. The branch intersection part 45 is a portion where some wire-like transmission member 40 intersects with the other some wire-like transmission member 40 to be branched therefrom. The branch intersection part 45 is provided in the branch part 44. The displacement intersection part 46 is a portion where the wire-like transmission members 40 parallelly arranged intersect with each other to change their arrangement order. The displacement intersection part 46 is provided in a parallel route part. The displacement intersection part 46 may be provided in the branch part 44. Any combination is applicable as a combination of two wire-like transmission members 40 constituting the intersection parts 45 and 46. The first wire-like transmission member 40A and the second wire-like transmission member 40B may intersect with each other in the intersection parts 45 and 46. The first wire-like transmission members 40A or the second wire-like transmission members 40B may intersect with each other in the intersection parts 45 and 46.

Two holding members 30 are provided in positions on both sides of the bending part 43. The plurality of wire-like transmission members 40 are bended between two holding members 30. Three holding members 30 are provided in positions sandwiching the branch part 44 and the branch intersection part 45. The plurality of wire-like transmission members 40 are branched and intersect with each other between three holding members 30. Two holding members 30 are provided in positions on both sides of the displacement intersection part 46. The plurality of wire-like transmission members 40 intersect with each other between two holding members 30.

The first wire-like transmission member 40A and the second wire-like transmission member 40B are arranged in parallel to each other at least in a part of a section on the sheet 20. In the example illustrated in FIG. 1, the section where the first wire-like transmission member 40A anti the second wire-like transmission member 40B are arranged in parallel to each other extends over a whole section disposed on the sheet 20.

In the section where the first wire-like transmission member 40A and the second wire-like transmission member 40B are arranged in parallel to each either, the number of the first wire-like transmission members 40A or the second wire-like transmission members 40B may be larger than that of the other members, or the number of both the members may be the same as each other. In the example illustrated in FIG. 2, four first wire-like transmission members 40A and three second wire-like transmission members 40B are arranged in parallel to each other.

The plurality of second wire-like transmission members 40B are arranged in parallel to each other at intervals. The interval between the second wire-like transmission members 40B is smaller than a diameter of the second wire-like transmission member 40B. The interval between the second wire-like transmission members 40B may be equal to or larger than the diameter of the second wire-like transmission member 40B.

Figure 4:
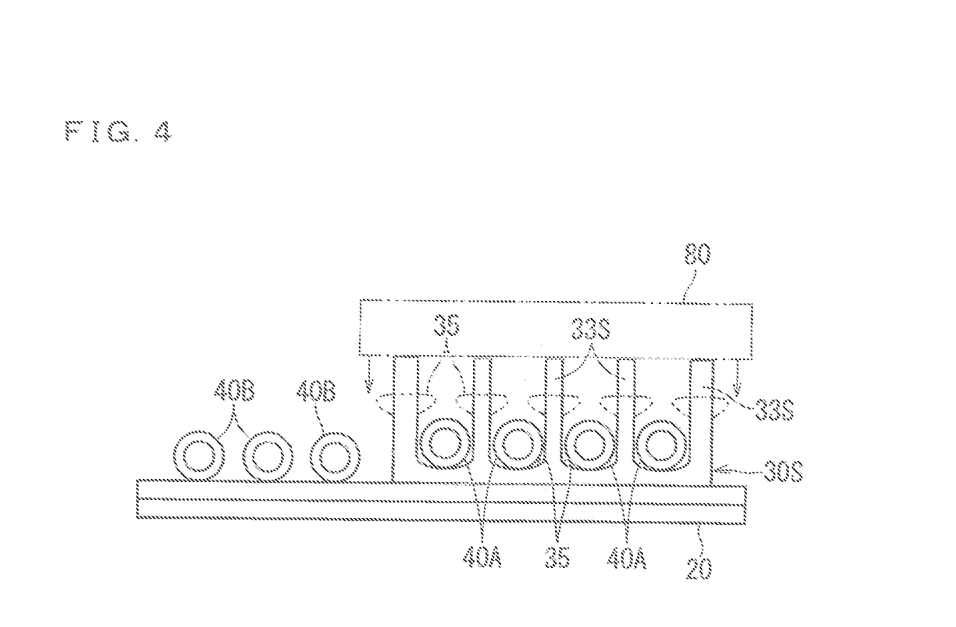
FIG. 4 is an explanation diagram illustrating a state where a protrusion is formed.

The protrusion 35 is formed by thermally deforming a tip end of the sidewall part 33 of the groove 34. A state where the protrusion 35 is formed is described with reference to FIG. 4. FIG. 4 is an explanation diagram illustrating the state where the protrusion 35 is formed.

The holding member 30 illustrated by a solid line in FIG. 4 is the holding member 30 before the protrusion 35 is formed. In the description hereinafter, the holding member 30 and the sidewall part 33 before the formation of the protrusion 35 are referred to as the holding member 30S find the sidewall part 33S in some cases to be distinguished from the holding member 30 and the sidewall part 33 after the formation of the protrusion 35.

The protrusion 35 is not formed in the sidewall part 33S of the holding member 30S. A height of the sidewall part 33S in the holding member 30S is higher than that of the sidewall part 33 in the holding member 30. The sidewall part 33 extends to have substantially the same thickness from a base end portion to a tip end portion. An inward surface of the tip end portion of the sidewall part 33 may be an inclined surface for guiding the wire-like transmission member 40 to the groove 34. A width dimension of the groove 34 in the tip end portion of the sidewall part 33 may be wider than a width dimension of the groove 34 on a side of the bottom part 32. The holding member 30S made of resin as a material is formed by extrusion molding or injection molding. A type of the resin material is not particularly limited, however, PVC, PE, PP, and PET, for example, can be adopted. When the holding member 30 is fused to the fusion layer 21, the resin material is preferably the same as the resin material of the fusion layer 21.

The first wire-like transmission member 40A is housed in the groove 34 in the holding member 30S. In this state, the tip end portion of the sidewall part 33S of the holding member 30S is thermally deformed, and the protrusion 35 illustrated by a virtual line in FIG. 4 is formed, thereby constituting the holding member 30. The tip end portion of the sidewall part 33S is crushed by a melt head 80, for example.

More specifically, the melt head 80 includes a tip end surface capable of having contact with the tip end portions of the plurality of sidewall parts 33S. The melt head 80 is a device heated by a heating part such as a heater, for example. The melt head 80 is heated to a temperature at which the melt head 80 can soften the sidewall part 33S. The heated melt head 80 is pressed against the tip end portion of the sidewall part 33S. Then, the tip end portion of the sidewall part 33S is softened by the melt head 80, and is crushed. The tip end portion of the sidewall part 33 which has been softened and crushed is pressed and widened to an upper side of the opening of the grooves 34 on both sides. The protrusion 35 narrowing the opening part of the groove 34 is thereby formed. Accordingly, the first wire-like transmission member 40A is kept in a state of being housed in the groove 34.

In the example illustrated in FIG. 2, the protrusions 35 of the sidewall parts 33 adjacent to each other do not have contact with each other. Thus, the groove 34 are slightly opened between the protrusions 35. The protrusions 35 of the sidewall parts 33 adjacent to each other may have contact with each other. The opening part of the groove 34 may be completely closed by the protrusion 35. A protrusion amount of the protrusion 35 is set as follows, for example. That is to say, the protrusion amount of the protrusion 35 may be set so that the holding member 30 is plastically deformed when the wire-like transmission member 40 is detached from the groove 34 after the formation of the protrusion 35. That is to say, the protrusion amount of the protrusion 35 may be set so that it is difficult to detach the wire-like transmission member 40 from the groove 34 within a range of the plastic deformation of the holding member 30. Accordingly, the wire-like transmission member 40 is hardly detached from the groove 34.

In the example illustrated in FIG. 4, the melt head 80 is applied while all of the plurality of first wire-like transmission members 40A held by one holding member 30 are housed in the grooves 34. It is difficult to arrange the plurality of first wire-like transmission members 40A in the groove 34 at the same time in some cases by reason that an introduction destination of the other end portions of the first wire-like transmission members 40A is different from each other, for example. In such a case, it is also applicable that the plurality of first wire-like transmission member 40A are divided into a plurality of groups, and the arrangement operation is performed for each group. For example, a first group made up of two wire dike transmission members 40 of four wire-like transmission members 40 and a second group made up of the other two wire-like transmission members 40 illustrated in FIG. 4 may be sequentially arranged in the grooves 34 at different operation timing. In this case, the operation of forming the protrusion 33 may be performed for each group. Furthermore, in this case, the position of the protrusion 35 may deviate in the extension direction in the groove 34 of the first group and the groove 34 of the second group. That is to say, the tip end portion of the sidewall part 33S in which the wire-like transmission member 40 of the first group is housed is thermally deformed in a first position along the extension direction to form the protrusion 35 for the first group. The tip end portion of the sidewall part 33S in which the wire-like transmission member 40 of the second group is housed is thermally deformed in a second position deviating from the first position along the extension direction to form the protrusion 35 for the second group.

The operation of fusing the sheet 20 and the second wire-like transmission member 40B, the operation of fixing the sheet 20 to the holding member 30, and the operation of forming the protrusion 35 can be performed in an optional order. Two or throe of these three operations may be performed at the same time.

Effect etc. of Embodiment 1

According to the wiring member 10 having the above configuration, the first wire-like transmission member 40A is held by the holding member 30 fixed to the sheet 20. The protrusion 35 is formed in the holding part 31, thus the first wire-like transmission member 40A hardly comes out of the groove 34. Accordingly, the wire-like transmission member 40 can be simply fixed to the sheet 20 regardless of a type of the wire-like transmission member 40. The second wire-like transmission member 40B is fused to the sheet 20. Accordingly, the wire-like transmission member 40 which can be fused to the sheet 20 is fused to the sheet 20, and the wire-like transmission member 40 which is hardly fused to the sheet 20 is held by the bolding member 30, thus is simply held by the sheet 20.

The holding member 30 is fused to the sheet 20. Accordingly, a member for fixing the sheet 20 and the holding member 30 can be omitted in the wiring member 10.

The first wire-like transmission member 40A includes the wire-like transmission member 40 in which the resin material of the covering layer 42 is different from the resin material of the sheet 20. Accordingly, the first wire-like transmission member 40A which is hardly fused to the sheet 20 is fixed to the sheet 20 via the holding member 30.

The tip end of the sidewall part 33 of the groove 34 is thermally deformed to form the protrusion 35. Accordingly, a shape of the holding member 30S before the formation of the protrusion 35 can be simplified. In a case where the wire-like transmission member 40 is not taken out from the groove 34 after the formation of the protrusion 35, when the protrusion 35 is formed to be large, detachment of the wire-like transmission member 40 from the groove 34 is suppressed.

The holding member 30 provided in a plurality of positions at intervals along the longitudinal direction of the first wire-like transmission member 40A is fixed to one sheet 20. Accordingly, the plurality of holding members 30 are positioned by the sheet 20. A region in which the holding member 30 is provided can be reduced compared with a case where the bolding member 30 is provided over the whole first wire-like transmission member 40A.

Embodiment 2

Figure 5:
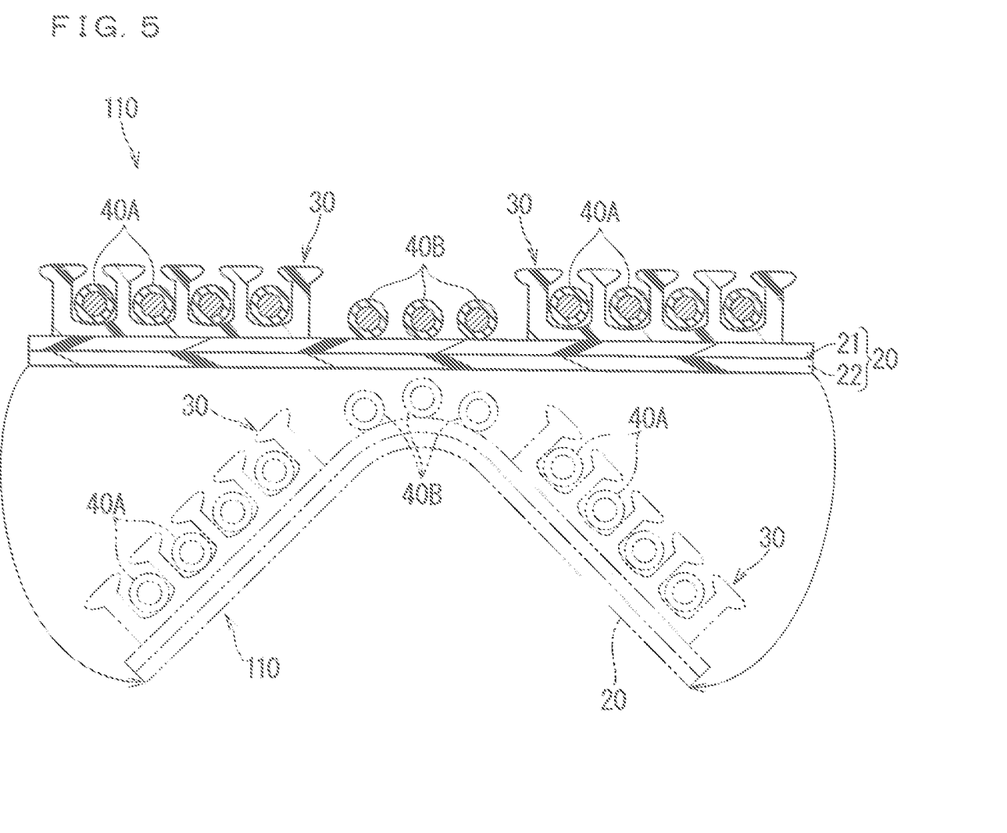
FIG. 5 is a cross-sectional view illustrating a wiring member according to an embodiment 2.

A wiring member according to an embodiment 2 is described. FIG. 5 is a cross-sectional plan view illustrating a wiring member 110 according to the embodiment 2. In the following description of the present embodiment, the same reference numerals are assigned to the similar constituent elements described above, and the description thereof will be omitted.

A position where the holding member 30 is provided on the sheet 20 in the wiring member 110 is different from that in the wiring member 10. Specifically, the plurality of holding members 30 are provided in a width direction of the sheet 20 in the wiring member 110. Accordingly, when the wiring member 110 is bended around an axis along the longitudinal direction as illustrated in FIG. 5, the sheet 20 is easily bended between the holding members 30, and bending of the holding member 30 is suppressed. Accordingly, when the wiring member 110 is bended around the axis along the longitudinal direction, the wire-like transmission member 40 hardly comes out of the holding member 30.

In the example illustrated in FIG. 5, two holding members 30 are provided in the width direction of the sheet 20. Three or more holding members 30 may be provided in the width direction of the sheet 20. In the example illustrated in FIG. 5, two holding members 30 are formed to have the same shape. Two holding members 30 may be formed to have different shapes. For example, the number of the grooves 34 may be different in two holding members 30.

In the example illustrated in FIG. 5, the second wire-like transmission member 40B is located between two holding members 30. Two holding members 30 may be located adjacent to each other so that the second wire-like transmission member 40B is not located between two holding members 30. In the example illustrated in FIG. 5, the holding member 30 is located on both side edge portions of the sheet 20. It is also applicable that the holding member 30 is located on an edge portion on one side of the sheet 20 and the second wire-like transmission member 40B is located on an edge portion on the other side thereof. It is also applicable that, the holding member 30 is located on an intermediate portion of the sheet 20 and the second wire-like transmission member 40B is located on both side edge portions of the sheet 20.

When the holding member 30 is provided in a plurality of positions at intervals along the extension direction of the first wire-like transmission member 40A in one sheet 20, the plurality of holding members 30 may be provided in the width direction in all of the plurality of positions. It is also applicable that the plurality of holding members 30 are provided in some of the plurality of positions and one holding member 30 is provided in the width direction in the other some of the plurality of positions.

Modification Example

In the above description, the wiring members 10 and 110 include the second wire-like transmission member 40B, however, this configuration is not necessary. The wiring members 10 and 110 may not include the second wire-like transmission member 40B. All of the wire-like transmission members 40 in the wiring members 10 and 110 may be held by the holding member 30, for example. The wire-like transmission member 40 which is not held by the holding member 30 in the wiring members 10 and 110 may be fixed to the sheet 20 by a fixing state other than fusion, for example. Applicable as the fixing slate is bonding via an intervention member such as an adhesive agent or a double-sided adhesive tape between the sheet 20 and the wire-like transmission member 40, for example. For example, the wire-like transmission member may be pressed toward the sheet 20 by a sewing thread, stapler, a single-sided adhesive tape, or a sheet different from the sheet 20.

In the above description, the holding member 30 is fused to the sheet 20, however, this configuration is not necessary. Any fixing state may be applied as a fixing state of fixing the holding member 30 and the sheet 20. For example, the holding member 30 and the sheet 20 may be bonded via an adhesive member such as an adhesive agent or a double-sided adhesive tape. For example, the holding member 30 and the sheet 20 may be fixed via a locking member such as a stapler. In this case, it is also applicable that a part of the bottom part 32 protrudes to a lateral side to constitute a flange part, and a locking member is locked to pass through the flange part and the sheet 20.

In the above description, the tip end of the sidewall part 33 of the groove 34 is thermally deformed to form the protrusion 35, however, this configuration is not necessary. The protrusion 35 may be previously formed before inserting the wire-like transmission member 40. In this case, it is sufficient that holding part 31 can be elastically deformed so that the opening part of the groove 34 is widened to a degree that the wire-like transmission member 40 can be inserted into the groove 34. The protrusion 35 is formed to protrude to both sides of one sidewall part 33 when the tip end of the sidewall part 33 of the groove 34 is thermally deformed to form the protrusion 35, however, this configuration is not necessary. The protrusion 35 may be formed to protrude to one side of one sidewall part 33. Such a protrusion 35 can be formed by bending the tip end portion of the sidewall part 33 which has ken heated and softened to an upper side of the groove 34 on one side.

In the above description, the first wire-like transmission members 40A are housed in all of the grooves 34, however, this configuration is not necessary. The first wire-like transmission member 40A may not be housed in some groove 34. In the above description, all of the plurality of first wire-like transmission members 40A housed in the grooves 34 have the same configuration, however, this configuration is not necessary. Some of the plurality of first wire-like transmission members 40A housed in the grooves 34 may have a configuration different from the other some of the plurality of first wire-like transmission members 40A. For example, the plurality of first wire-like transmission members 40A housed in the groove 34 may include a wire-like transmission member with a small diameter and a wire-like transmission member with a large diameter thus having different thickness.

In the above description, one first wire-like transmission member 40A is housed in one groove 34, however, this configuration is not necessary. The plurality of first wire-like transmission members 40A may be housed in one groove 34. The plurality of first wire-like transmission members 40A may be housed in one groove 34 to be parallelly arranged in a height direction (depth direction). The plurality of first wire-like transmission members 40A may be housed in one groove 34 to be parallelly arranged in a width direction. The plurality of first wire-like transmission members 40A may be housed in one groove 34 to be obliquely arranged therein. The number of the first wire-like transmission members 40A housed in the plurality of grooves 34 may be different from each other.

In the above description, the covering layer 42 of the first wire-like transmission member 40A is made of the resin material different from that of the fusion layer 21, however, this configuration is not necessary. The covering layer 42 of some or all of the first wire-like transmission members 40A may be made of the same resin material as that of the fusion layer 21. The wire-like transmission member 40 such as a twisted wire, for example, hardly fused to the fusion layer 21 may be held by the holding member 30 to constitute the first wire-like transmission member 40A.

When the route of the first wire-like transmission member 40A includes the branch part 44, the number of first wire-like transmission members 40A parallelly arranged on both sides of the branch part 44 may be changed. At this time, the shape of the holding member 30 may be commonalized on the both sides of the branch part 44. The second wire-like transmission member 40B fused to the sheet 20 in the route on one side of the branch part 44 may be housed in the holding member 30 in the route on the other side of the branch part 44.

The number of ware-like transmission members 40 in the plural types of wiring member may be changed in accordance with a type of vehicle, a grade, or on option, for example. At this time, the shape of the holding member 30 may be commonalized between the plural types of wiring member. The wire-like transmission member 40 which is provided or is not provided in accordance with the type of wiring member may be held by the commonalized holding member 30.

The configurations described in the embodiments and modification examples thereof can be appropriately combined as long as they are not contradictory.

EXPLANATION OF REFERENCE SIGNS 10, 110 wiring member
20 sheet
21 fusion layer
22 additional layer
30, 30S holding member
31 holding part
32 bottom part
33, 33S sidewall part
34 groove
35 protrusion
40 wire-like transmission member
40A first wire-like transmission member
40B second wire-like transmission member
41 transmission wire body
42 covering layer
43 bending part
44 branch part
45, 46 intersection part
80 melt head
C connector
WP fusion part
FP fixing part

The invention claimed is:
1. A wiring member, comprising:
a sheet;
at least one holding member fixed to the sheet;
a first wire-like transmission member held by the at least one holding member; and
a second wire-like transmission member fused to the sheet at a plurality of fusion positions spaced from one another in a longitudinal direction of the second wire-like transmission member, wherein
the first wire-like transmission member and the second wire-like transmission member extend in parallel to each other,
each of the at least one holding member is provided at a position on a lateral side of one of the fusion positions of the second wire-like transmission member,
the at least one holding member includes a holding part in which a groove and a protrusion narrowing a width dimension of an opening part of the groove are formed,
the first wire-like transmission member is housed in the groove,
the sheet has flexibility so as to be able to follow bending of the first wire-like transmission member,
the first wire-like transmission member includes a wire-like transmission member in which a covering layer is made of a first resin material,
a surface of the sheet on which the first wire-like transmission member is disposed is made of a second resin material different from the first resin material,
the second wire-like transmission member includes a covering layer of the second resin material, and
the at least one holding member is made of the second resin material having a hardness different from the sheet.
2. The wiring member according to claim 1, wherein the at least one holding member is fused to the sheet.
3. The wiring member according to claim 1, wherein the at least one holding member comprises a plurality of holding members that are provided in a width direction of the sheet.
4. The wiring member according to claim 1, wherein a tip end portion of a sidewall part of the groove is thermally deformed to form the protrusion.
5. The wiring member according to claim 1, wherein the at least one holding member comprises a plurality of holding members that are provided in a plurality of positions at intervals along a longitudinal direction of the first wire-like transmission member, and the plurality of holding members in the plurality of positions are fixed to one piece of the sheet.
6. The wiring member according to claim 1, wherein the at least one holding member does not have flexibility.
7. A wiring member, comprising:
a sheet;
at least one holding member fixed to the sheet;
a first wire-like transmission member held by the at least one holding member; and
a second wire-like transmission member fused to the sheet at a plurality of fusion positions spaced from one another in a longitudinal direction of the second wire-like transmission member, wherein
the first wire-like transmission member and the second wire-like transmission member extend in parallel to each other,
each of the at least one holding member is provided at a position on a lateral side of one of the fusion positions of the second wire-like transmission member,
the at least one holding member includes a holding part in which a groove and a protrusion narrowing a width dimension of an opening part of the groove are formed, the first wire-like transmission member is housed in the groove, and the sheet includes a flat surface on a back side of the at least one holding member.

8. The wiring member according to claim 7, wherein the first wire-like transmission member includes a wire-like transmission member in which a covering layer is made of a first resin material, and a surface of the sheet on which the first wire-like transmission member is disposed is made of a second resin material different from the first resin material.

9. A wiring member, comprising:

a sheet;

at least one holding member fixed to the sheet;

a first wire-like transmission member held by the at least one holding member, wherein the at least one holding member includes a holding part in which a groove and a protrusion narrowing a width dimension of an opening part of the groove are formed, and the first wire-like transmission member is housed in the groove, the wiring member further comprising a second wire-like transmission member fused to the sheet at a plurality of fusion positions spaced from one another in a longitudinal direction of the second wire-like transmission member, wherein the first wire-like transmission member and the second wire-like transmission member extend in parallel to each other, and each of the at least one holding member is provided at a position on a lateral side of one of the fusion positions of the second wire-like transmission member.

10. A wiring member, comprising:

a sheet;

first and second holding members fixed to the sheet;

a first wire-like transmission member held by the first and second holding members; and a second wire-like transmission member fused to the sheet at first and second fusion positions, which are spaced from each other in a longitudinal direction of the second wire-like transmission member, wherein the first wire-like transmission member and the second wire-like transmission member extend in parallel to each other, the first and second holding members are respectively provided at first and second positions on a lateral side of the first and second fusion positions of the second wire-like transmission member, the first holding member includes a holding part in which at least one groove and a protrusion narrowing a width dimension of an opening part of the at least one groove are formed, the first wire-like transmission member is housed in one of the at least one groove of the first holding member, a tip end portion of a sidewall part of the at least one groove is thermally deformed to form the protrusion, the second holding member includes a plurality of grooves, and a protrusion in which a tip end portion of a sidewall part which is common between the grooves adjacent to each other is thermally deformed to cover both the grooves adjacent to each other, the first wire-like transmission member is housed in one of the plurality of grooves of the second holding member, and the number of the plurality of grooves in the second holding member is greater than the number of the at least one groove in the first holding member.

\* \* \* \* \*